March 7, 1950 W. C. WEBER 2,500,105
METHOD OF MAKING LAMINATED HOLLOW GLASS ARTICLES
Filed April 23, 1941 5 Sheets-Sheet 1

Inventor
Walter C. Weber
by Brown & Parham
Attorneys

March 7, 1950     W. C. WEBER     2,500,105
METHOD OF MAKING LAMINATED HOLLOW GLASS ARTICLES
Filed April 23, 1941     5 Sheets-Sheet 2
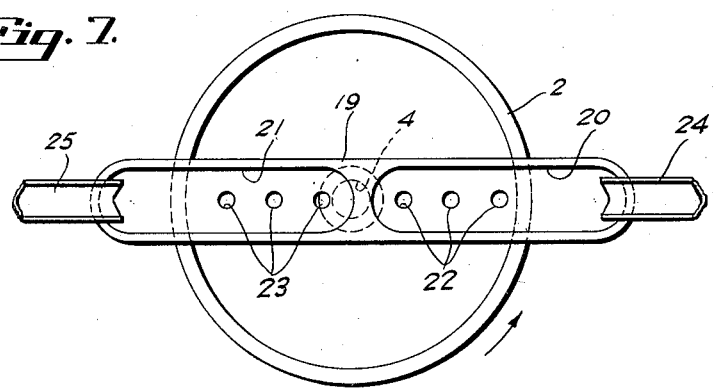
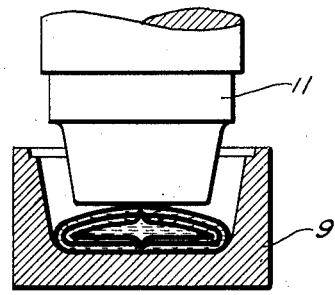
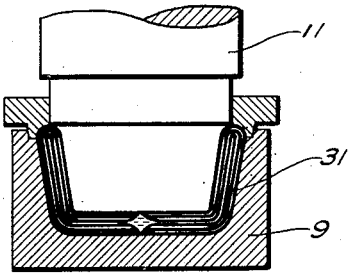
Inventor
Walter C. Weber.
by Brown & Parham
Attorneys

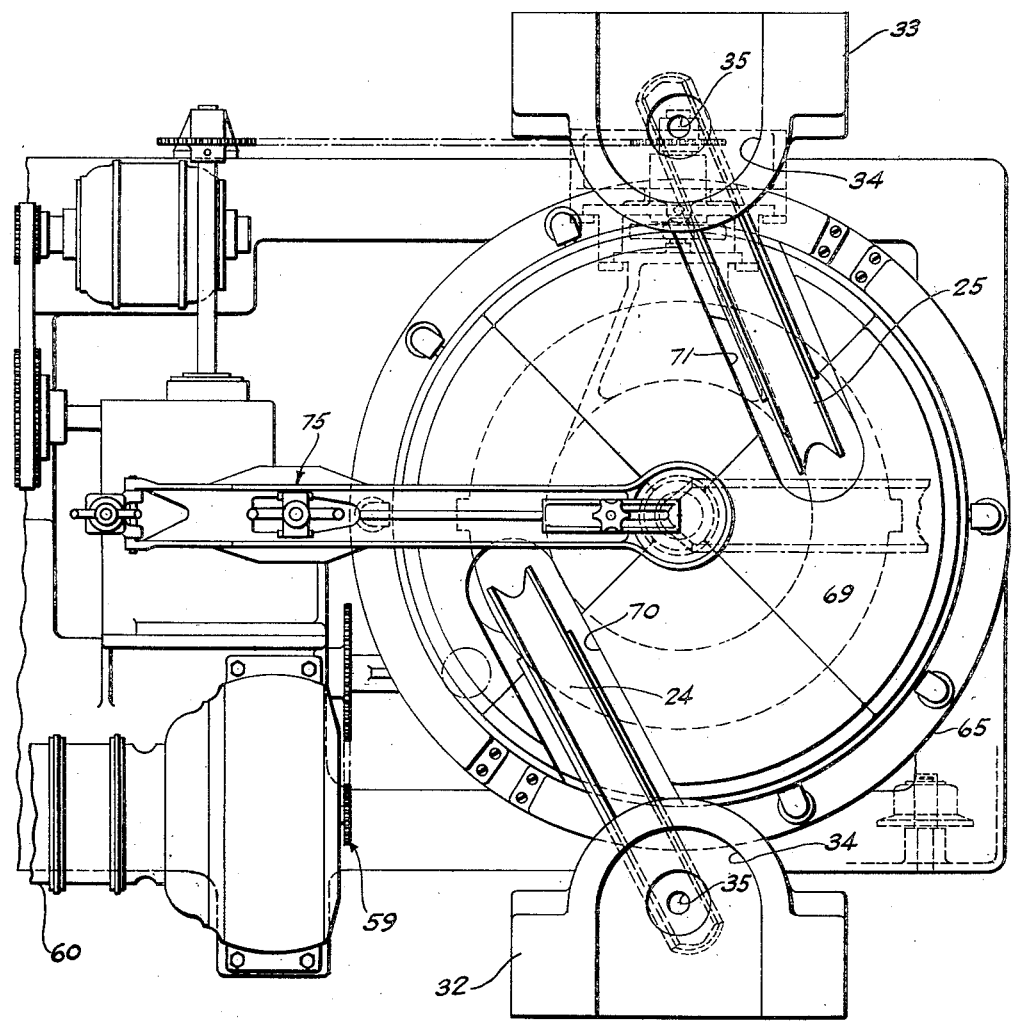

March 7, 1950 W. C. WEBER 2,500,105
METHOD OF MAKING LAMINATED HOLLOW GLASS ARTICLES
Filed April 23, 1941 5 Sheets-Sheet 4

Inventor
Walter C. Weber
by Brown + Parham
Attorneys

March 7, 1950 W. C. WEBER 2,500,105
METHOD OF MAKING LAMINATED HOLLOW GLASS ARTICLES
Filed April 23, 1941 5 Sheets-Sheet 5

Inventor
Walter C. Weber.
by Brown & Parham
Attorneys

Patented Mar. 7, 1950

2,500,105

UNITED STATES PATENT OFFICE 2,500,105

METHOD OF MAKING LAMINATED HOLLOW GLASS ARTICLES

Walter C. Weber, West Hartford, Conn., assignor to Hartford-Empire Company, Hartford, Conn., a corporation of Delaware Application April 23, 1941, Serial No. 389,898

3 Claims. (Cl. 49—79)

This invention relates to methods of producing hollow glass articles.

The principal object of the invention is to provide glass articles of hollow form, such as bottles, jars, dishes, etc., having walls made up of layers or laminations of glasses of different descriptions, qualities or characteristics.

To attain this object, the layers or laminations of the walls of such an article may consist of glasses having different coefficients of expansion, or different softening temperature points, such layers or laminations being so arranged that the outer layer of the walls of the article, when it has been molded to final form and after cooling, is placed in compression as a result of the differences in the characteristics of the glass of the several layers. Instead of or in addition to forming the several layers or laminations of glasses having different coefficients of expansion or different softening points, the glass of the outer layer may be such as to protect the inner layer or layers from the action of the atmosphere or other fluid or substance to which the walls of the article may be exposed in service. Thus, the outer layer may consist of silica-free glass which will protect other silica-containing glass layers from atmospheric attack on the silica in such layers. The outer layer may be formed of glass more resistant to any applied force or substance than the inner layer or layers or the several layers may be formed of glasses differing as to color, composition or other known quality or feature.

I am aware that heretofore it has been proposed to form sheets of flat or plate glass of three layers, the outer layers being formed of glass of lower coefficient of expansion than the inner layer, but so far as I am aware, I am the first to propose the manufacture of molded or hollow glass articles with laminated walls from charges of molten glass and having the characteristics above mentioned. Also, I believe I am the first to devise a suitable method for producing such glassware.

A further object of the invention is the provision of a novel method of supplying the forming machines, in which hollow articles are formed, with charges of molten glass made up of laminations or layers of different kinds of glass and suitable for molding operations.

A further object is to supply molten glass of different characteristics in two or more streams to the surface of a pool of glass in a rotating bowl at points differently spaced from the axis of rotation of the bowl.

The present invention is in part predicated upon certain experimental work done by me in connection with laminated glass cane. In such work, three or more layers of molten glass were gathered upon a blow pipe, the last of the layers being of glass having a lower coefficient of expansion than the glass of the adjacent inner layers and the gathered glass was formed into cane. Such cane was considerably stronger than a similar cane made from a gathering of the same number of successive layers of either of the glasses. By using glasses having coefficients of expansion differing by as much as .0000029, I have increased the strength of cane as much as 350%. This increased strength results from the character of the strain set up in the glass during its cooling, the inner layers of higher expansivity shrinking to a greater extent than the outer layers and placing the latter under compression. Similar effects may be obtained by employing glass having a relatively high softening point in the outer layers and glass having a relatively low softening point in the inner layers.

Also, it has been demonstrated by experimental work carried out by certain of my associates that molded hollow articles which have been processed by rapid chilling or tempering have walls composed of exterior layers placed in compression and are considerably stronger than annealed articles of the same kind. I propose to make hollow molded articles having the same or greater strength than such tempered articles by the use of two or more different kinds of glass. The articles which I have proposed will have the virtues of a well-tempered article, as well as additional useful characteristics, such as the inherent return after heating and cooling to a desired strain pattern when cool.

To carry out the present invention in a practical, commercial way, it is desirable to provide an automatic feeding device capable of producing and delivering to the molds of an automatic forming machine a series of similar charges of proper weight and shape in which the several kinds of glass are so distributed that the desired laminations will exist in the walls of the molded articles produced by the forming machine.

It also is desirable that, on cooling, the outer layers of all parts of the walls be placed in compression. This result will be obtained if the outer layers of the charges have a lower coefficient of expansion or a higher softening point than the glass of adjacent interior layers.

In one mode of operation contemplated by the invention, a usual automatic molding machine, such as a press, press-and-blow machine, or blowing machine fed by separated charges may be employed to form the article in the usual way.

In another mode of operation, the invention may be used in connection with a machine of the type that forms glass articles from portions of a molten glass ribbon.

In carrying out the invention, I preferably employ a rotary feeder bowl, having an orifice in its bottom and a sloping well thereabove, both located on the axis of rotation of the bowl. The bowl may flare upwardly and outwardly to provide a container for a pool of glass of upwardly enlarging diameter into which glass of two different kinds of descriptions may be brought from different sources. Preferably, such glass should be delivered to the pool in streams entering at different distances from the axis of the pool, that having lower coefficient of expansion or the higher softening point being delivered nearer the periphery of the pool.

In the preferred form of the invention, I propose to obtain a considerable number of alternating layers of two different kinds of glass in each charge, the layers being arranged in the charges like onion skins, the outer layers of the lower expansion glass and adjacent inner layers of higher expansion, the layers of the different glass alternating. In certain instances, it is practical to employ but two such layers in the charge.

In the accompanying drawings:

Fig. 7 is a plan view showing a novel glass pouring spout or receptacle above the feeder bowl for use in delivering each of two different glasses in a plurality of different streams to such bowl, the glass being omitted;

Fig. 8 is a diagrammatic view, mainly in vertical section, showing the rotary glass feeder bowl and associate glass severing means as used to produce a laminated charge when glasses of two different kinds are delivered to the bowl in radially spaced streams, as from the outlets of the pouring spout shown in Fig. 7;

Fig. 9 is a view similar to Fig. 2, showing the third form of laminated charge in the press mold;

Fig. 10 is a view similar to Fig. 3, showing the pressing of the third form of laminated charge into an article of the final shape desired;

Fig. 11 is a plan view of glass feeding apparatus adapted for use in performing methods of the invention;

Figure 1:
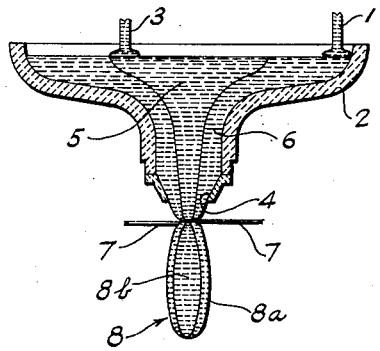
Figure 1 is a diagrammatic view, mainly in vertical section, showing a rotary glass feeder bowl and associate glass severing means as used to provide a laminated mold charge according to the invention.

Figure 1 illustrates a simple application of features of the invention in which a stream 1 of lower expansion glass is fed into a rotating bowl 2 at a point near its periphery and a stream 3 of glass of higher expansion is fed into such bowl at a place nearer to the axis of rotation of the bowl. The rotation of the bowl is about a vertical axis coinciding with the vertical axis of the central outlet 4 at the lower end of the tapering bottom portion of the feeder bowl. Glass from the streams will flatten out and spread in the feeder bowl and also will be circulated or moved angularly about the axis of rotation of the bowl while descending or moving downwardly in the latter toward the bottom outlet thereof. According to the arrangement and procedure illustrated in Fig. 1, the glass of higher expansivity delivered to the feeder bowl by the stream 3 forms a central body or core 5 completely within and surrounded by a sheath or outer layer 6 of glass of lower expansivity from the outer stream 1. The issuance of glass from the feeder bowl outlet to form a suspended charge mass therebeneath may be controlled by a reciprocating vertical plunger (not shown in Fig. 1) or other suitable known glass discharge control means. Such a suspended charge mass will comprise a central body or core of the high expansion glass surrounded by a layer of the low expansion glass. A suitable severing means, represented in Fig. 1 by the blades 7, may be operated at an appropriate time to sever a charge 8 from the oncoming glass. I prefer to use a severing mechanism having blades which are rotated about the axis of the charge mass and are also moved downward as they are being closed, the severing preferably being of such a character that glass of the outer lamination or layer will be spun, bent or worked inwardly by the shearing action over the higher expansion glass of the core at the severed end of the charge and at the lower end of the embryonic next succeeding mold charge mass, each of an outer layer 8a of low expansion glass completely covering a body or core 8b of glass of higher expansivity.

Figure 2:
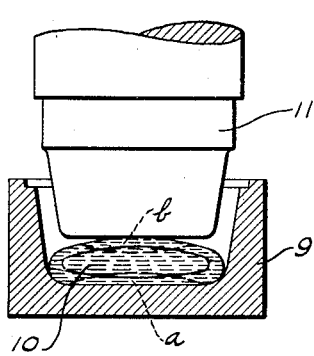
Fig. 2 shows the laminated charge in a press mold beneath a pressing plunger at approximately the instant of contact of the latter with the charge.
Figure 3:
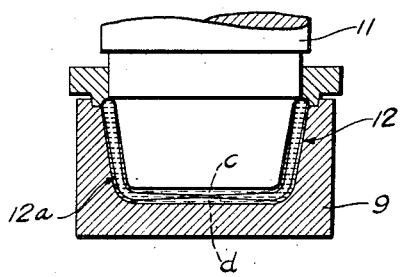
Fig. 3 shows the finally formed or pressed article in the press mold.

If such a charge is dropped into an open mold 9, Fig. 2, in which it is to be pressed into an article of the desired shape, the charge will settle as indicated at 10, the glass layers or components substantially retaining their relative positions. Shortly after its delivery into the mold, the charge may be contacted by a pressing plunger 11. The first contact of the charge with the bottom of the mold and with the tip of the plunger locally chills the charge on its upper and lower surfaces, this chill penetrating and tending to set up or stiffen the glass of the portions of the charge indicated at a and b in Fig. 2. The further movement of the plunger will not displace these chilled portions to the same extent as the remainder of the charge so that glass of the latter will be forced outwardly and upwardly by the downwardly moving plunger 11 to form the side walls of the pressed article 12, Fig. 3. As the initially chilled portions a and b are chiefly portions of the outer or low expansion layer of the charge, the glass which is pressed upwardly to form the side walls of the pressed article contains a disproportionately large amount of the inner higher expansion glass. This tends to make the outer compression layer 12a of low expansion glass, which extends over the entire surface of the pressed article, relatively thick at the inner and outer portions of the bottom of the article as indicated at c and d, respectively, in Fig. 3.

This difference in thickness of the outer layer in different parts of an article may set up secondary strains which may be undesirable in some instances. I may, however, obviate such difference by a somewhat different and usually preferable mode of operations or series of steps contemplated by the present invention. This will now be explained with reference first to the operations or steps of the method of Figs. 4 to 6, inclusive, and then to the operations or steps of the method of Figs. 8 to 10, inclusive.

Figure 4:
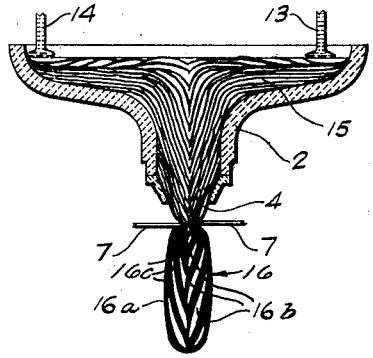
Fig. 4 is a view similar to Fig. 1 but showing a different way to produce a laminated charge by the use of the same feeder bowl and severing means.

As shown in Fig. 4, glasses from two sources, one of high expansion glass and one of low expansion glass, are fed to the bowl 2 in two streams 13 and 14, respectively. The stream 14 of low expansion glass discharges into the bowl at the periphery thereof and the stream 13 of higher expansion glass discharges into the opposite side of the bowl at a point located a short distance radially inward from such periphery. The tendency of the glass from each stream to flatten out or spread on discharge into the bowl, the rotation of the bowl, and the drag on each newly added increment of glass by the glass passing to the outlet of the bowl will combine to produce a supply pool 15 consisting of a considerable number of distinct but somewhat irregularly disposed, relatively thin, alternating layers or laminations which respectively are of low and higher expansion glasses, beginning with the outermost layer which is formed of low expansion glass from the stream 14. In Fig. 4, the layers or laminations of high expansion glass are indicated by the white spaces between adjacent colored lines and areas which denote the layers or laminations of low expansion glass.

A charge 16 is shown in Fig. 4 as it is being severed from the glass of the supply pool. This charge consists of an outer covering layer of low expansion glass, indicated at 16a and formed of the outer sheath of glass that has descended through the bowl next to the wall thereof, and a series of somewhat spirally disposed alternating layers or laminations 16b and 16c, respectively, of high and lower expansion glasses. The high expansion glass layers 16b are indicated by the white or uncolored spaces or areas between the colored lines or areas which denote low expansion glass layers or laminations 16c.

Figure 5:
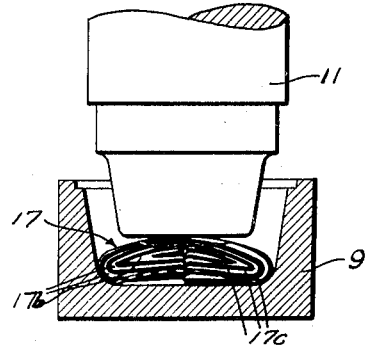
Fig. 5 is a view similar to Fig. 2, showing the second form of laminated charge in the press mold.

In Fig. 5, the charge, now designated 17, is shown after it has settled somewhat in the mold 9 and at about the instant of first contact of the pressing plunger with the upper portion thereof. It will be noted that such charge consists of alternating layers or laminations 17c and 17b, respectively, of low expansion and higher expansion glasses, the latter being denoted by white or uncolored spaces or areas between the colored lines or areas which indicate low expansion glass.

Figure 6:
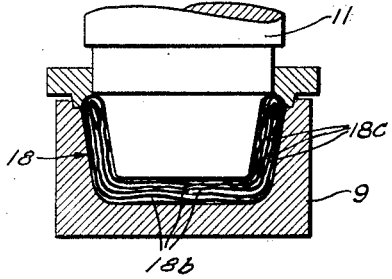
Fig. 6 is a view similar to Fig. 3, showing the pressing of the second form of laminated charge into an article of the final shape desired.

In Fig. 6, the glass of the charge has been pressed to the shape desired for the finally formed article 18. Alternating layers or laminations 18c and 18b, respectively, of low expansion and higher expansion glasses, respectively, have been indicated in this article in the same manner as in the charges in Figs. 4 and 5. It will be noted that approximately proportionate amounts of glasses of both high and lower expansivity were displaced upwardly by the descent of the pressing plunger to form the side walls of the article 18 so that there is not the tendency to cause a sometimes undesirable difference of thickness of different portions of the outer compression layer of the pressed article 18 as in the case of the article produced by the operations heretofore described in connection with Figs. 1 to 3, inclusive.

Each of a plurality of different kinds of glasses may be fed to the feeder bowl in a plurality of separate streams, all such streams being located in relation to the axis of rotation of the bowl and to one another to provide the desired series or arrangement of concentric glass layers or laminations in the whole body or pool of glass in the bowl. To this end, a suitable pouring spout or pouring spouts, each having the desired number and relative arrangement of pouring outlets, may be provided above the feeder bowl in a suitable position or positions to receive molten glass or glasses from appropriate supply means and to deliver such glass or glasses in separate streams to the feeder bowl. As shown in Fig. 7, such a pouring spout comprises a member 19 extending transversely across the space directly above the feeder bowl so that one open-topped pouring compartment 20 in such member extends radially of the bowl in one direction and a second generally similar open-topped pouring compartment 21 extends radially of the bowl in the opposite direction. The pouring compartment 20 has a plurality of pouring openings or outlets 22 in its bottom spaced radially of the feeder bowl. The pouring compartment 21 has a plurality of pouring openings or outlets 23 in its bottom spaced radially of the feeder bowl. In the example shown, each pouring compartment has three regularly spaced bottom outlets but the respective outlets 22 are located farther from the axis of rotation of the bowl than the corresponding outlets 23.

In use, glass of lower expansivity may be supplied to the pouring compartment 20, as by a trough 24, Fig. 7, and glass of higher expansivity may be supplied to the pouring compartment 21 by a similar trough 25. Radially spaced streams of the low expansion glass will descend into the feeder bowl from the compartment 20 and radially spaced streams of high expansion glass likewise will descend from the pouring compartment 21 into such bowl. Portions of the streams of low expansion glass are indicated at 26 and of the high expansion glass at 27 in Fig. 8. It will be noted that such streams will provide a feed body or pool in the feeder bowl consisting of alternating layers or laminations 28 and 29 of low and high expansion glasses, respectively, the low expansion glass layers being outermost.

A charge 30 having such concentric alternating laminations or layers may be obtained as shown in Fig. 8 and dropped or otherwise delivered to a mold 9 in which it may be pressed, Figs. 9 and 10, to form an article 31 of the final shape desired.

The glass of the several layers will maintain more or less their relative positions in the glass wall as the article is formed so that the desired arrangement of layers is secured. By using a plurality of laminations, the strength of the walls of the article is not seriously affected if the outer lower expansion layers are relatively thin, as the adjacent layer is also thin and is backed by a second layer of low expansion glass which may have not been affected by the initial chill and is of the desired thickness.

Figure 12:
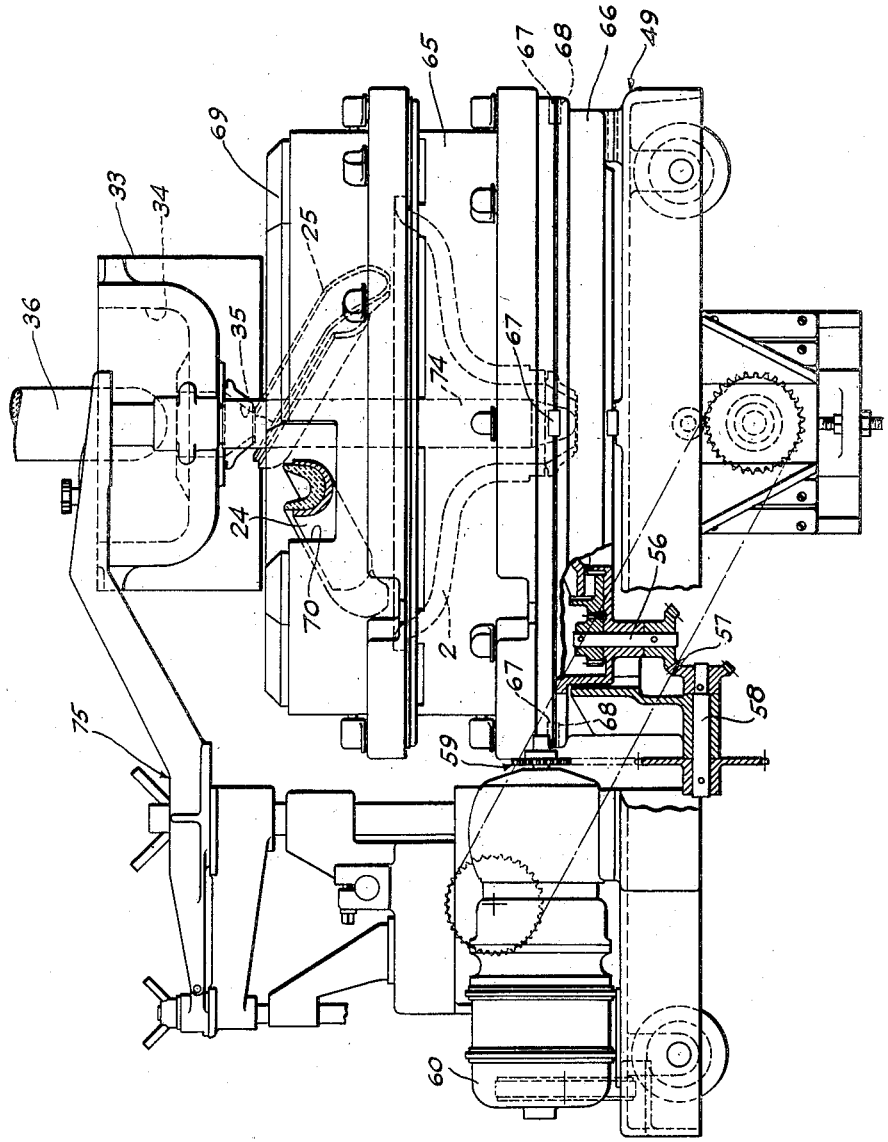
Fig. 12 is a view, mainly in elevation but with some parts in section, showing the apparatus of Fig. 11.
Figure 13:
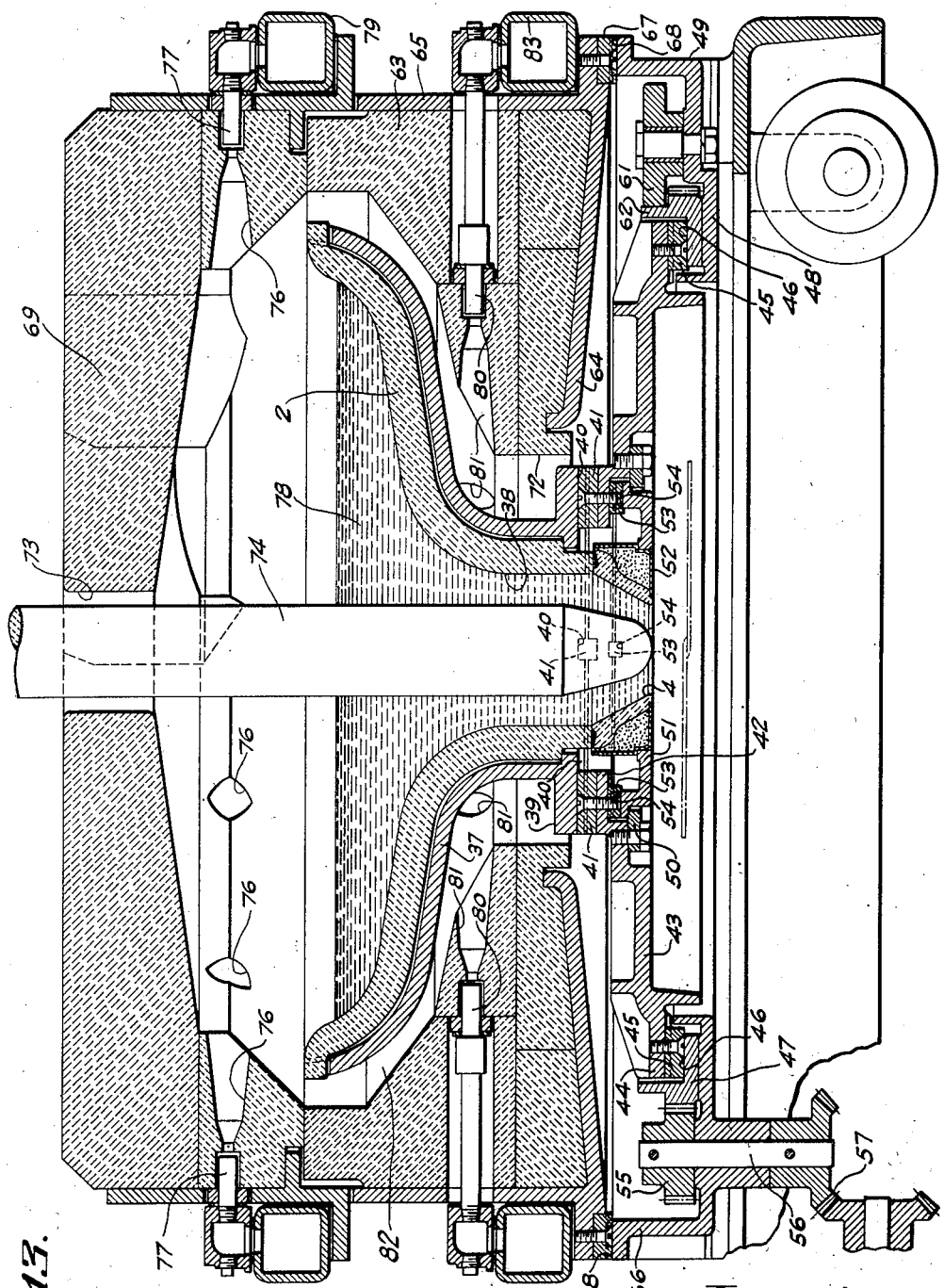
Fig. 13 is a relatively enlarged vertical sectional view of the rotary feeder bowl and its mounting and housing structure.

In Figs. 11, 12 and 13, I have shown a practical example of glass feeding apparatus adapted for use in the production of laminated glass articles in accordance with such invention. Such apparatus may comprise a pair of feeder forehearths or glass conditioning chambers 32 and 33, respectively, Fig. 11, to contain and condition a relatively low expansion glass and a high expansion glass. Each of these chambers terminates in a bowl 34 having a downwardly opening orifice 35, which may be controlled by suitable known means, such as the plug 36, Fig. 12. A constantly flowing stream of properly conditioned molten glass from each of the orifices 35 may be carried as by one of the aforesaid troughs 24 or 25 for delivery to the rotating feeder bowl 2. The streams of glass may be delivered directly to the feeder bowl 2 at predetermined or selected places therein, as indicated in Figs. 1 and 4 or through an intermediate pouring device such as that shown in Fig. 7.

The preferred form of structure for supporting and rotating the feed bowl 2 is shown in Fig. 13. This structure comprises a metallic holder 37, preferably of Nichrome or other refractory metal, carrying the refractory glass feeding bowl 2. The latter preferably has a shape somewhat like that of an upwardly flaring funnel, as shown, the main portion thereof tapering to a well 38 which is provided at its bottom with the outlet 4.

The holder 37 has a flat bottomed flange 39 at its lower end. This flange is provided at regularly spaced places around its bottom surface with radial slots or keyways, three of which are indicated at 40 in Fig. 13. The holder 37 is supported upon radial keys 41, three of which are shown in Fig. 13, which have flat upper portions received in the keyways 40 and which rest upon and are secured to a somewhat elevated inner ring portion 42 of an annular generally horizontal web member 43. The latter has an outer horizontal ring portion 44, to the underside of which radial keys are secured at regularly spaced places around the under-surface of such ring, two of these keys being indicated at 45 in Fig. 13. Such keys rest in radial keyways, two of which are indicated at 46 in the upper surface of the inner portion of a ring gear 47 which is rotatably supported on an annular flat bearing portion 48 of a supporting frame structure 49.

The inner portion of the web 43 carries at its underside a retaining ring 50 which supports an annular holder 51 for orifice ring structure 52 at the outlet 4 of the feeder bowl. The aforesaid inner ring portion 42 of the web 43 also carries at its bottom side radial keys, shown at 53, corresponding in number and arrangement with the keys 41. The keys 53 extend into radial keyways, three of which are indicated at 54 in Fig. 13 in the orifice ring holder 51.

Clearance is provided as shown in Fig. 13 at the ends of the several keys to permit the parts connected by the keys working in keyways to expand and contract radially in response to variations of temperature but such connected parts cannot move relatively, as entities, angularly or laterally. Also, rotation of the ring gear 47 on its bearing will cause like movement of the intermediate web 43 and of the feeder bowl 2, its orifice ring structure and its holder, as a unit. The ring gear may be rotated by a drive pinion 55 carried by a short vertical shaft 56 which is journaled in a suitable bearing in the supporting frame structure 49 and receives motion through the agency of the enmeshed gears, indicated at 57, Figs. 12 and 13, the sprocket carrying shaft 58, Fig. 12, and the motion transmitting connections indicated generally at 59, Fig. 12, between the shaft 58 and a suitable source of driving power, such as the motor 60.

The ring gear 47 is of course engaged at one place by the driving pinion 55, as aforesaid. For cooperation with this driving pinion, a plurality of rollers, one of which is indicated at 61 in Fig. 13, may be provided at suitably spaced places around the ring gear in rolling contact with an upstanding annular flange 62 on such ring gear to retain the latter in place on its bearing member 48 and especially against lateral bodily movements relative to such bearing member. The arrangement just described assures that rotary movements of the feeder bowl will be about a vertical axis coinciding with the vertical axis of the feed outlet of such bowl and prevents any eccentric rotary movement of the bowl around such axis.

The feeder bowl may be housed within a suitable housing, comprising refractory side walls generally indicated at 63, supported on an inwardly extending ledge or flange 64 at the lower end of an upstanding annular shell or casing 65, surrounding the refractory housing structure. The shell or casing 65 may be supported upon the flanged upper end of a supporting ring 66 which may constitute part of the main supporting frame structure 49. Preferably, radial keys, some of which are indicated at 67 in Figs. 12 and 13, are secured to the casing 16 at the bottom part thereof and work in radial keyways, some of which are indicated at 68 in Figs. 12 and 13 in the horizontally flanged upper part of the supporting ring 66. This arrangement permits relatively radial expansion and contraction of the adjacent parts of the housing and supporting frame structures while preventing undesirable displacement of the housing relative to the feeder bowl.

The feeder housing may have a top structure of refractory material, indicated at 69. Such top structure may be cut away or apertured, as at 70 and 71, Fig. 11, to accommodate portions of the glass conducting troughs 24 and 25, respectively.

The housing is of course, provided at the bottom of its side walls with a suitable opening, indicated at 72, Fig. 13, to accommodate the lower portion of the holder 37 and of the feed bowl within such holder.

The housing 69 may have a central opening 73 in its top structure, substantially aligned with the axis of the feed bowl 2, to accommodate a vertical refractory implement, such as the plunger indicated at 74, for controlling discharge of glass through the outlet of the feed bowl. The vertical plunger 74 may be supported at its upper end and reciprocated vertically by a suitable plunger supporting and operating mechanism, generally indicated at 75 in Figs. 11 and 12. This plunger supporting and operating mechanism may be substantially like that which is included in the well known Hartford Single Feeder and may be substantially as disclosed in United States Patent No. 1,760,254, granted to Peiler, May 27, 1930, as assignor to the Hartford-Empire Company. Such a mechanism includes adjustments by which the plunger may be properly disposed in relation to the axis of the feeder outlet and the strokes of the plunger may be adjusted as to the amplitude and limits of its strokes, etc., as desired or as required to meet various service conditions.

The housing for the feeder bowl may be provided with a circumferential series of upper burner ports, some of which are shown at 76, in Fig. 13, and with burners, some shown at 77, which may fire through these ports into the upper part of the housing above and onto the pool 78 of glass in the feeder bowl. These burners may be provided with a suitable fuel mixture by suitable connections with a manifold 79. Other burners, some of which are indicated at 80 in Fig. 13, may fire through suitable radial ports 81 in a lower portion of the housing structure to supply heat to the exterior of the feeder bowl and thence through an annular space 82 between the bowl and its housing to the space within the housing about the bowl and the glass in such bowl. The burners 80 may receive a suitable fuel mixture through connections with a manifold 83. Heating means substantially as described assure prevention of undue loss of heat from the glass through the bowl and surrounding structure and also provide efficient control of the temperature and condition of the glass in the bowl, including that next to the refractory walls of the bowl.

Glass severing means for use with the feeder may be omitted and the glass may be fed from the outlet of the feeder bowl in a continuously flowing stream.

It is to be understood that the low expansion and high expansion glasses referred to as specific examples may also differ in other respects than in their coefficients of expansion, or that various respectively different kinds of glasses may be used according to the present invention irrespective of their relative coefficients of expansion. Thus, silica-free glass may be supplied to form the surface layer of the final glass article, at either the exterior or the interior or at both the exterior and the interior of such an article so as to protect silica-containing glass of an inner lamination or inner laminations from atmospheric attack, this irrespective of any difference in the coefficients of expansion of such glasses. Silica-free glass is known, as has been pointed out in the patent to J. R. Baker, No. 1,547,715, of July 28, 1925.

I claim:

1. The method of making hollow glass articles having laminated walls, which comprises delivering a plurality of streams of molten glasses of different coefficients of expansion at separated points on the surface of a rotating pool of glass whereby to create a body of glass having substantially concentric layers of such different glasses, flowing the glass from the bottom of the pool through an orifice concentric with said axis of rotation, separting the flowing glass into mold charges by periodically severing similar end portions therefrom and delivering them to molds of a forming machine, and molding the charges by pressure and heat extraction to form similar hollow articles having walls made up of laminations of glass of different coefficients of expansion.

2. The method of making hollow glass articles having laminated walls, which comprises delivering a plurality of streams of molten glasses having different softening points at separated points on the surface of a rotating pool of glass whereby to create a body of glass having concentric layers of such different glasses, flowing the glass from the bottom of the pool through an orifice concentric with said axis of rotation, separating the flowing glass into mold charges by periodically severing similar end portions therefrom and delivering them to molds of a forming machine, and molding the charge by pressure and heat extraction to form similar hollow articles having walls made up of laminations of glass having different softening points and different conditions of strain.

3. The method of making laminated hollow glassware that comprises rotating a funnel-shaped rotary feed bowl having a downwardly opening discharge outlet at its axis of rotation and supplying two streams of molten glasses of different characters to different parts of the interior of the bowl to form therein a pool consisting of a plurality of layers of glass, one within the other, discharging glass from said pool through the orifice in a suspended column composed of outer and inner layers of glasses of different characters, severing mold charges from successive lower end portions of said suspended column to provide each mold charge with a substantially complete outer layer of one glass surrounding an inner mass of another glass, delivering the charges into molds, molding the charges into hollow glass articles without rupturing the layers thereof, whereby the walls of the articles consist of a plurality of layers of glasses of different characters.

WALTER C. WEBER.

REFERENCES CITED

The following references are of record in the file of this patent:

UNITED STATES PATENTS

| Number | Name | Date |
|---|---|---|
| 460,358 | Butler | Sept. 29, 1891 |
| 1,529,947 | Freese | Mar. 17, 1925 |
| 1,547,715 | Baker | July 28, 1925 |
| 1,715,130 | Haley | May 28, 1929 |
| 1,760,254 | Peiler | May 27, 1930 |
| 1,770,335 | Fuwa | July 8, 1930 |
| 1,828,226 | Hiller | Oct. 20, 1931 |
| 1,828,229 | Marsh | Oct. 20, 1931 |
| 1,828,443 | Rankin | Oct. 20, 1931 |
| 1,832,491 | Locreille | Nov. 17, 1931 |
| 1,873,866 | Barker, Jr. | Aug. 23, 1932 |
| 1,960,121 | Moulton | May 22, 1934 |
| 1,997,798 | Kucera | Apr. 16, 1935 |
| 2,062,623 | Wadsworth | Dec. 1, 1936 |
| 2,164,184 | Wadsworth | June 27, 1939 |
| 2,166,563 | Wadsworth | July 18, 1939 |
| 2,177,336 | Shover et al. | Oct. 24, 1939 |

FOREIGN PATENTS

| Number | Country | Date |
|---|---|---|
| 1,268 | Great Britain | A. D. 1780 |
| 494,452 | Great Britain | Oct. 26, 1938 |
| 612,120 | France | July 24, 1926 |
| 849,842 | France | Aug. 28, 1939 |

OTHER REFERENCES

Glass, the Miracle Maker, Phillips, published by Pitman Pub. Co., New York, 1941. Pages 169, 170, 189 and 190. (Copy in Div. 5.)